(12) United States Patent
Shirakawa et al.

(10) Patent No.: US 10,270,676 B2
(45) Date of Patent: Apr. 23, 2019

(54) SIGNAL DETECTING DEVICE

(71) Applicant: Hitachi Metals, Ltd., Tokyo (JP)

(72) Inventors: Yohei Shirakawa, Hitachi (JP); Koki Hirano, Hitachinaka (JP); Yoshitake Ageishi, Hitachi (JP); Yuki Haga, Takahagi (JP)

(73) Assignee: HITACHI METALS, LTD., Tokyo (JP)

( * ) Notice: Subject to any disclaimer, the term of this patent is extended or adjusted under 35 U.S.C. 154(b) by 71 days.

(21) Appl. No.: 15/248,839

(22) Filed: Aug. 26, 2016

(65) Prior Publication Data

US 2017/0063663 A1    Mar. 2, 2017

(30) Foreign Application Priority Data

Aug. 31, 2015 (JP) ................................. 2015-170022

(51) Int. Cl.
*H04L 12/26* (2006.01)

(52) U.S. Cl.
CPC .............. *H04L 43/12* (2013.01); *H04L 43/50* (2013.01)

(58) Field of Classification Search
CPC ......... A61B 8/00; A61B 8/4438; F02D 41/22; F02D 41/222; G01D 3/08; G01R 31/005; G01R 31/11; G01S 7/52079; H04B 3/462
See application file for complete search history.

(56) References Cited

U.S. PATENT DOCUMENTS

| 6,594,508 | B1 * | 7/2003 | Ketonen ................ G01R 29/10 455/422.1 |
| 2011/0015882 | A1 * | 1/2011 | Guilhemsang ......... G01R 31/11 702/59 |
| 2014/0327538 | A1 * | 11/2014 | Cudak .................. G01R 31/041 340/539.1 |

FOREIGN PATENT DOCUMENTS

| JP | 2000-171515 A | 6/2000 |
| JP | 2003-248534 A | 9/2003 |
| JP | 2012-060389 A | 3/2012 |
| JP | 2012-508956 A | 4/2012 |
| WO | WO 2010/056821 A1 | 5/2010 |

OTHER PUBLICATIONS

Japanese Office Action, dated Feb. 26, 2019, in Japanese Application No. 2015-170022 and English Translation thereof.

* cited by examiner

*Primary Examiner* — Yemane Mesfin
*Assistant Examiner* — Mon Cheri S Davenport
(74) *Attorney, Agent, or Firm* — McGinn I.P. Law Group, PLLC.

(57) ABSTRACT

A signal detecting device provided in a connector at an end of a communication cable or in a communication device to which the connector is connected. The signal detecting device includes a detection circuit that branches and extracts a portion of a signal transmitted through the communication cable and indicates existence of a data communication based on the extracted signal, and a self-diagnostic circuit that inputs a diagnostic signal into the detection circuit upon diagnosis of the detection circuit.

16 Claims, 2 Drawing Sheets

| 10 MATCHING CIRCUIT | 11 AMPLIFIER CIRCUIT |
| --- | --- |
| 12 RECTIFIER CIRCUIT | 13 COMPARATOR CIRCUIT |
| 14 LIGHT-EMITTING CIRCUIT | |
| 16 OSCILLATOR CIRCUIT | |
| 17 MATCHING CIRCUIT | |

8 DETECTION CIRCUIT
17 MATCHING CIRCUIT

SIGNAL DETECTING DEVICE

The present application is based on Japanese patent application No. 2015-170022 filed on Aug. 31, 2015, the entire contents of which are incorporated herein by reference.

BACKGROUND OF THE INVENTION

1. Field of the Invention

The invention relates to a signal detecting device.

2. Description of the Related Art

In data centers etc., connection of communication cables such as LAN (local area network) cables is altered in accordance with layout change, displacement or addition of information and communication equipments such as servers or hubs.

An information and communication equipment is known which has a connection check lamp for checking connection of communication cables so that it is possible to determine whether or not a communication cable is connected.

Also, an equipment has been proposed in which connection of a communication cable is monitored by detecting insertion and removal of a connector of the communication cable (see e.g., JP-A-2012-508956).

SUMMARY OF THE INVENTION

The prior arts only allow physical connection of the communication cable to be checked and has a problem that it is not possible to check whether or not communication is actually being performed through the communication cable, i.e., it is not possible to check the data communication state.

It is therefore considered that workers or users may pull out the communication cable by mistake without noticing that it is in the process of communication, causing failures such as shutdown of the information communication equipment or corruption of data during transfer. Accidental removal of communication cable leads to serious loss (causes serious risk) especially in case of major lines, etc., in data centers.

Also, signal detecting devices for detecting data communication status are desired to have a self-diagnostic function to prevent that the device indicates, due to problem such as failure, that "no data communication is performed" even though data communication is being performed. Such a measure is required because, when, e.g., wire breakage, etc., occurs in the signal detecting device, there is a risk that the signal is interrupted and the device indicates "no data communication" even though the data communication is being performed.

It is an object of the invention to provide a signal detecting device that allows the indication function of a data communication status so as to prevent the accidental removal of a communication cable as well as a self-diagnostic function thereof.

According to an embodiment of the invention, a signal detecting device provided in a connector at an end of a communication cable or in a communication device to which the connector is connected comprises:

a detection circuit that branches and extracts a portion of a signal transmitted through the communication cable and indicates a data communication status based on the extracted signal; and a self-diagnostic circuit that inputs a diagnostic signal into the detection circuit upon diagnosis of the detection circuit.

Effects of the Invention

According to an embodiment of the invention, a signal detecting device can be provided that allows the indication function of a data communication status to prevent the accidental removal of a communication cable as well as a self-diagnostic function thereof.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment

An embodiment of the invention will be described below in conjunction with the appended drawings.

Figure 1A:
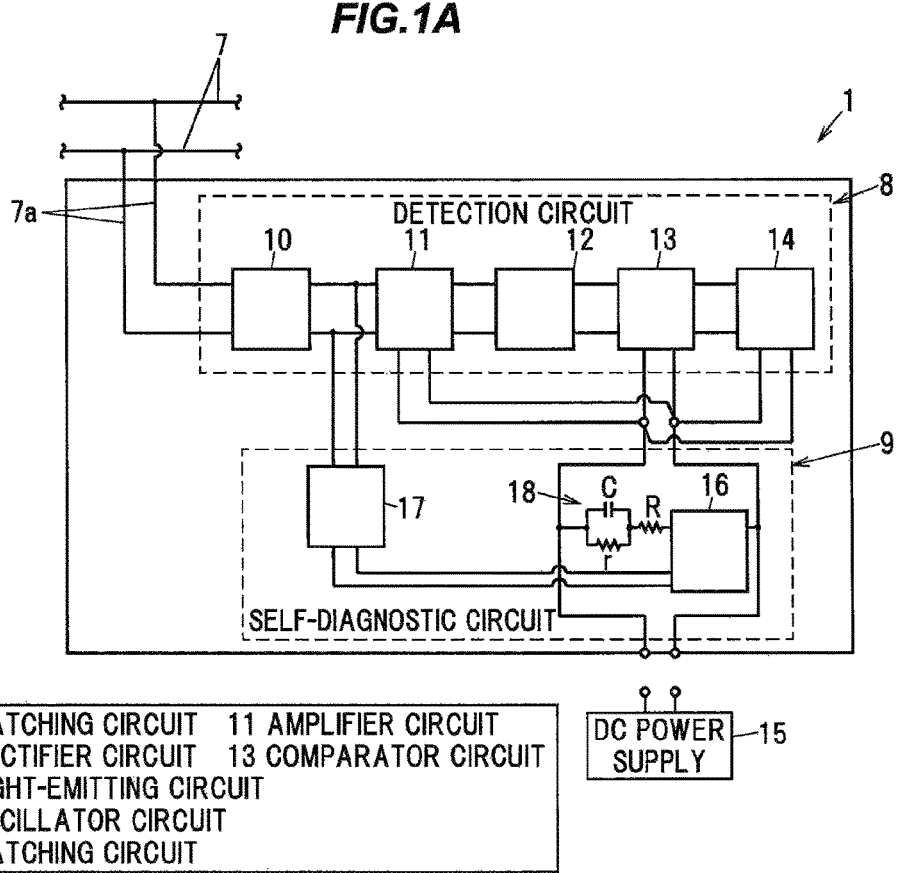
FIG. 1A is a schematic configuration diagram illustrating a signal detecting device in an embodiment of the present invention.
Figure 1B:
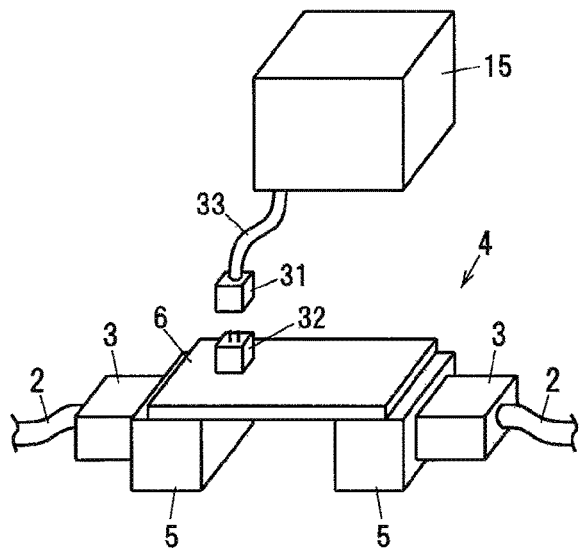
FIG. 1B is a perspective view showing a relay connector mounting the signal detecting device.

FIG. 1A is a schematic configuration diagram illustrating a signal detecting device in the present embodiment and FIG. 1B is a perspective view showing a relay connector mounting the signal detecting device As shown in FIGS. 1A and 1B, a signal detecting device 1 is provided in a connector 3 provided at an end of a communication cable 2 transmitting differential signals or, in a communication device (a relay connector 4 in the embodiment) to be connected to the connector 3, to detect data communication status. The signal detecting device 1 when provided in the relay connector 4 will described here, but the signal detecting device 1 may be provided in another communication device such as network switch or server.

The communication cable 2 having four pairs of signal lines (eight in total) for transmitting differential signals is used in the present embodiment.

The relay connector 4 is provided with two connectors 5 (e.g., jack connectors conforming to the RJ45 standard) respectively connected to the connectors 3 (e.g., plug connectors conforming to the RJ45 standard) provided at ends of the communication cables 2, and a circuit board 6 mounting the both connectors 5. Four pairs of transmission paths 7 are formed on the circuit board 6 of the relay connector 4 so that the four pairs of signal lines of the communication cable 2 connected to the connector 5 are electrically connected to the four pairs of signal lines of the other communication cable 2 connected to the other connector 5. FIG. 1A shows only one of the four pairs of transmission paths 7.

The signal detecting device 1 is provided with a detection circuit 8, a self-diagnostic circuit 9 and a battery (DC power supply) 15 as an external power supply.

The battery 15 is a separate component from the relay connector 4, and is configured that a power connector 31 provided at an end of a power line 33 extending out of the battery 15 is connected to a circuit board-side power connector 32 provided on the circuit board 6 of the relay connector 4, and power is thereby supplied to the signal detecting device 1. Alternatively, power may be externally supplied to the signal detecting device 1 through a wire or wirelessly without providing the battery 15.

Detection Circuit 8

The detection circuit 8 branches and extracts a portion of a signal transmitted through the communication cable 2 and indicates data communication status based on the extracted signal.

The detection circuit 8 is composed of a matching circuit 10, an amplifier circuit 11, a rectifier circuit 12, a comparator circuit 13 and a light-emitting circuit 14 which are connected sequentially. The amplifier circuit 11, the comparator circuit 13 and the light-emitting circuit 14 are configured to receive power from a battery 15.

The matching circuit 10 is to provide impedance matching in a predetermined frequency band. In the present embodiment, since a portion of a signal transmitted through the communication cable 2 is branched and extracted, the matching circuit 10 also serves to adjust the level of a signal extracted from the communication cable 2.

In the present embodiment, branch transmission paths 7a branched from a given pair of the transmission paths 7 enter the matching circuit 10. The matching circuit 10 is constructed from, e.g., a resistive circuit.

The amplifier circuit 11 is a circuit which amplifies the signal extracted from a given signal line of the communication cable 2 (the transmission path 7) through the matching circuit 10 and outputs the amplified signal to the downstream rectifier circuit 12. As the amplifier circuit 11, it is possible to use, e.g., a grounded emitter circuit. However, the specific configuration of the amplifier circuit 11 is not limited thereto. Although the amplifier circuit 11 is a single-stage configuration in the present embodiment, the amplifier circuit 11 may be a multistage configuration.

The rectifier circuit 12 rectifies the AC signal amplified by the amplifier circuit 11 into a DC signal and outputs the DC signal to the downstream comparator circuit 13. As the rectifier circuit 12, it is possible to use a well-known full-wave rectifier circuit or half-wave rectifier circuit.

The comparator circuit 13 is a circuit which is turned on and outputs the DC signal with a predetermined voltage to the downstream light-emitting circuit 14 when the output voltage of the rectifier circuit 12 is not less than a preset threshold voltage (offset voltage).

Providing the comparator circuit 13 allows a signal with a constant voltage to be output to the light-emitting circuit 14 even when the output voltage of the rectifier circuit 12 is small as long as offset voltage of the comparator 13 is set to a low level, and it is thereby possible to stably operate the light-emitting circuit 14. Therefore, it is possible to reduce the level of the signal extracted from the communication cable 2 by increasing the resistance value of resistors Rin of the matching circuit 10, which reduces reflection loss and insertion loss and thus suppresses deterioration in quality of the signal transmitted through the communication cable 2.

Meanwhile, strength of the signal transmitted through the communication cable 2 may be different depending on a communication device connected to the communication cable 2 or length of the communication cable 2. However, since the comparator circuit 13 is provided, it is possible to stably operate the light-emitting circuit 14 even when the strength of the signal transmitted through the communication cable 2 is small. Furthermore, since the output voltage of the rectifier circuit 12 can be reduced, it is possible to reduce output voltage of the amplifier circuit 11, to lower power consumption, and even to suppress deterioration in signal quality caused because the output signal of the amplifier circuit 11 enters the communication cable 2.

The light-emitting circuit 14 indicates the data communication status by emitting light based on the output from the comparator circuit 13. In the present embodiment, the light-emitting circuit 14 has two light emitting elements (light-emitting diodes) emitting different colors and is configured to indicate the data communication status by emitting different colors. In this example, the light-emitting circuit 14 is configured that a blue light-emitting element emits light when data communication is being performed (when the comparator circuit 13 is ON) and a red light-emitting element emits light when data communication is not performed (when the comparator circuit 13 is OFF).

As such, in the present embodiment, the light-emitting circuit 14 always emits light from one of the light-emitting elements during when power is supplied from the battery 15. In other words, if both light-emitting elements of the light-emitting circuit 14 do not emit light even though power is supplied from the battery 15, it indicates that some sort of malfunction such as wire breakage or failure is occurring in the signal detecting device 1.

Self-Diagnostic Circuit 9

The self-diagnostic circuit 9 is a circuit which inputs a diagnostic signal into the detection circuit 8 at diagnosis of the detection circuit 8 and thereby determines whether or not the detection circuit 8 is operating normally.

In the present embodiment, the self-diagnostic circuit 9 is configured to input the diagnostic signal into the detection circuit 8 for a predetermined period of time from the moment the battery 15 is connected and power supply to the detection circuit 8 is started.

In detail, the self-diagnostic circuit 9 is provided with an oscillator circuit 16, a self-diagnostic circuit-side matching circuit 17 and a time-constant circuit 18.

The oscillator circuit 16 is a circuit which generates a diagnostic signal. In the present embodiment, a signal simulating the signal transmitted through the communication cable 2 (the signal input to the detection circuit 8) is generated by the oscillator circuit 16. Therefore, the oscillator circuit 16 is configured that a signal, which is of similar frequency and similar power to the signal transmitted through the communication cable 2 and is detectable by the detection circuit 8, is output as the diagnostic signal. The specific configuration of the oscillator circuit 16 is not specifically limited and it is possible to use the oscillator circuit 16 with a configuration suitable for frequency, etc., of the signal transmitted through the communication cable 2.

The self-diagnostic circuit-side matching circuit 17 is a circuit provided between the oscillator circuit 16 and the detection circuit 8 to adjust the signal level of the diagnostic signal which is input from the oscillator circuit 16 to the detection circuit 8. The self-diagnostic circuit-side matching circuit 17 also serves to prevent the signal extracted from a given signal line of the communication cable 2 (the transmission path 7) through the matching circuit 10 from being sent to the oscillator circuit 16.

In the present embodiment, the self-diagnostic circuit-side matching circuit 17 is arranged so that an input thereof is connected to the oscillator circuit 16 and an output is connected to an input of the amplifier circuit 11 of the detection circuit 8. The self-diagnostic circuit-side matching circuit 17 is constructed from, e.g., a resistive circuit.

The time-constant circuit 18 is configured to supply power to the oscillator circuit 16 only for a preset period of time from the moment power supply from the battery 15 is started. In a power supply circuit for supplying power from the battery 15 to the oscillator circuit 16, the time-constant circuit 18 is connected in series to the oscillator circuit 16.

In the present embodiment, the time-constant circuit 18 is provided with a capacitance element C and a resistive element R connected in series thereto, and is configured to control operating time of the oscillator circuit 16 based on the time constant determined by the capacitance element C and the resistive element R. The capacitance element C is connected in parallel to a resistive element r through which the capacitance element C discharges. The specific configuration of the time-constant circuit 18 is not limited to that shown in the drawing and can be appropriately changed.

Operation of Signal Detecting Device 1

When the battery 15 is connected to the signal detecting device 1, electric current flows through the capacitance element C of the time-constant circuit 18 to the oscillator circuit 16, the oscillator circuit 16 is thereby driven and outputs a diagnostic signal. Also, when the battery 15 is connected, the power is supplied to the amplifier circuit 11, the comparator circuit 13 and the light-emitting circuit 14.

The diagnostic signal output from the oscillator circuit 16 is input to the detection circuit 8 via the self-diagnostic circuit-side matching circuit 17, is amplified by the amplifier circuit 11, is rectified by the rectifier circuit 12 and is then input to the comparator circuit 13 which is thereby turned on. This causes the light-emitting circuit 14 to emit light from the blue light-emitting element.

As such, when there is no malfunction in the amplifier circuit 11, the rectifier circuit 12, the comparator circuit 13 and the light-emitting circuit 14, blue light indicating "data communication is being performed" is emitted from the blue light-emitting element of the light-emitting circuit 14 regardless of the data communication status of the communication cable 2.

On the other hand, when a malfunction such as wire breakage or failure is occurring in the amplifier circuit 11, the rectifier circuit 12, the comparator circuit 13 or the light-emitting circuit 14, red light indicating "data communication is not performed" is emitted from the red light-emitting element of the light-emitting circuit 14. Also when the light-emitting circuit 14 does not emit light from any of the light-emitting elements, some sort of malfunction is considered to be occurring.

Once a predetermined time elapses from the start of power supply by the battery 15 and the capacitance element C of the time-constant circuit 18 is charged, an electric current to the oscillator circuit 16 is interrupted and the oscillator circuit 16 stops outputting the diagnostic signal. Accordingly, after elapse of the predetermined time from the start of power supply, the light-emitting circuit 14 emits light from the blue light-emitting element when "data communication is being performed" and emits light from the red light-emitting element when "data communication is not performed", based on the signal extracted from a given signal line of the communication cable 2 (the transmission path 7) through the matching circuit 10.

Table 1 summarizes color changes in the emitted light of the light-emitting circuit 14 of the signal detecting device 1 as described above.

TABLE 1

| | Color of emitted light of light-emitting circuit | | | |
|---|---|---|---|---|
| | Detection circuit in normality | | Detection circuit in malfunction | |
| | Data communication in progress | No data communication | Data communication in progress | No data communication |
| At start of power supply | blue | blue | red | red |
| After elapse of predetermined time | blue | red | red | red |

As shown in Table 1, the signal detecting device 1 is configured that the color of light emitted from the light-emitting circuit 14 is blue at the time of turning on the power when the detection circuit 8 is operating normally. On the other hand, the color of light emitted from the light-emitting circuit 14 is red when a malfunction such as wire breakage or failure occurs in the detection circuit 8. Therefore, based on the color of light emitted from the light-emitting circuit 14 at the time of turning on the power, it is possible to recognize whether or not the detection circuit 8 is malfunctioning.

Meanwhile, a malfunction such as failure potentially occurs in the self-diagnostic circuit 9. Even in such a case, it is possible to recognize a malfunction of the signal detecting device 1 if the color of light emitted from the light-emitting circuit 14 at the time of turning on the power is red. Even if the self-diagnostic circuit 9 is malfunctioning, the color of light emitted from the light-emitting circuit 14 at the time of turning on the power is blue when data communication is being performed through the communication cable 2 as long as the detection circuit 8 is operating normally. In this case, the signal detecting device 1 can be used as is since the detection circuit 8 is operating normally and troubles such as accidental removal of the communication cable 2 do not occur. In this regard, however, the signal detecting device 1 is desirably replaced immediately in such a case since the self-diagnostic function is lost. For this reason, the signal detecting device 1 may be additionally provided with, e.g., an indicator circuit which indicates whether or not the diagnostic signal is output from the oscillator circuit 16.

Although an example of applying the invention to the relay connector 4 having a pair of input/output ports (connectors 5) has been described in the present embodiment, the invention is also applicable to communication devices having more input/output ports.

Figure 2A:
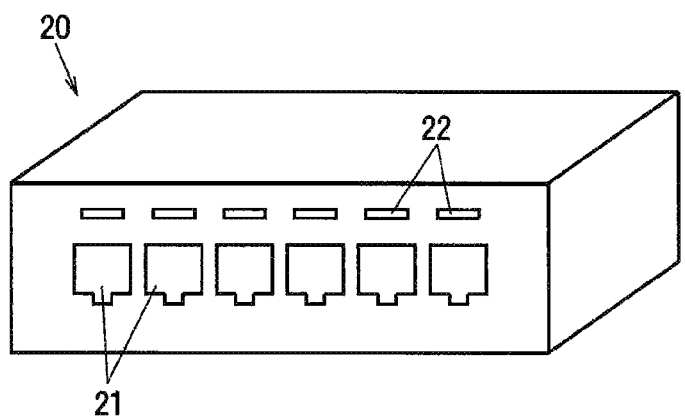
FIG. 2A is a perspective view showing a patch panel.
Figure 2B:
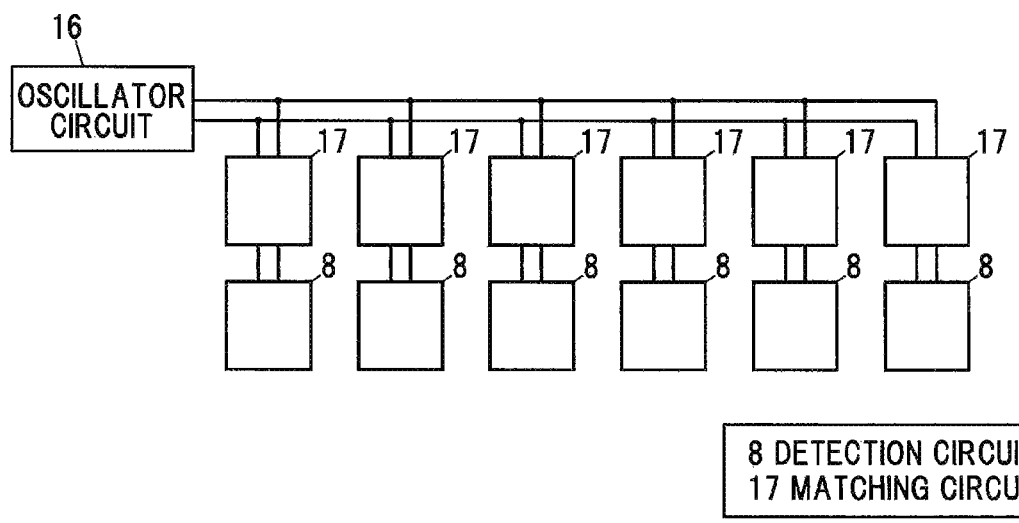
FIG. 2B is a schematic configuration diagram illustrating the signal detecting device mounted on the patch panel.

For example, when the invention is applied to a patch panel 20 with plural input/output ports 21 (six in this example), plural detection circuits 8 (six in this example) are provided so as to respectively correspond to the input/output ports 21 as shown in FIGS. 2A and 2B. Light-emitting portions 22 for checking light emission from the light-emitting circuits 14 of the detection circuits 8 respectively corresponding to the input/output ports 21 are formed on the patch panel 20 in the vicinity of (above, in this example) the respective input/output ports 21.

When providing plural detection circuits 8, the self-diagnostic circuit 9 is desirably configured such that the diagnostic signal generated by the single oscillator circuit 16 is input to each of the plural detection circuits 8. In detail, the self-diagnostic circuit 9 is provided with plural self-diagnostic circuit-side matching circuits 17 respectively corresponding to the detection circuits 8 and is configured that an output of the oscillator circuit 16 is connected to the respective inputs of the self-diagnostic circuit-side matching circuits 17. The outputs of the self-diagnostic circuit-side matching circuits 17 are respectively connected to the inputs of the amplifier circuits 11 of the corresponding detection circuits 8. In FIG. 2B, the time-constant circuit 18 is not shown.

In such a configuration, it is not necessary to provide the oscillator circuit 16 for each input/output port 21 and it is thus possible to reduce the cost. It is further desirable that power be supply to the oscillator circuit 16 as well as the detection circuits 8 from the battery 15 as an external power supply even though it is not shown in FIG. 2B.

Functions and Effects of the Embodiment

As described above, the signal detecting device 1 in the present embodiment is provided with the detection circuit 8 which branches and extracts a portion of the signal transmitted through the communication cable 2 and indicates data communication status based on the extracted signal, and the self-diagnostic circuit 9 which inputs the diagnostic signal into the detection circuit 8 at the time of diagnosis of the detection circuit 8.

Since the detection circuit 8 is provided, it is possible to detect whether or not the signal is transmitted through the communication cable 2 and thereby possible to prevent accidental removal of the communication cable 2. In addition, since the communication cable 2 not in use for data communication can be easily checked by the detection circuit 8, work efficiency during the removal of the communication cables 2 is improved.

In the event of failure of the detection circuit 8, the device may indicate that "data communication is not performed" even though the data communication is being performed through the communication cable 2, and the communication cable 2 in use for data communication may be pulled out by mistake.

Based on this, the self-diagnostic circuit 9 is provided in the present embodiment to realize the self-diagnostic function to diagnose whether or not the detection circuit 8 is operating normally. As a result, even when the detection circuit 8 malfunctions, accidental removal of the communication cable 2 can be prevented. In this regard, when the detection circuit 8 malfunctions, the faulty signal detecting device 1 is replaced with a new signal detecting device 1 in a state that data communication is suspended by, e.g., temporality interrupting data communication through the communication cable 2.

In addition, in the signal detecting device 1 in the present embodiment, the self-diagnostic circuit 9 is composed of the oscillator circuit 16, the self-diagnostic circuit-side matching circuit 17 and the time-constant circuit 18. Therefore, a control IC, etc., is not required and the self-diagnostic circuit 9 is realized at low cost.

In addition, since the self-diagnostic circuit 9 in the present embodiment is configured to input the diagnostic signal into the detection circuit 8 for a predetermined period of time from the moment power supply to the detection circuit 8 is started, diagnosis of the detection circuit 8 is automatically performed at the time of turning on the power and this prevents workers from pulling out the communication cable 2 without performing the diagnostic work. In addition, since the diagnostic work is automatically performed when the power is turned on, the diagnostic work is easier than, e.g., when performing the diagnostic work by pressing a switch, etc.

Summary of the Embodiments

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A signal detecting device (1) provided in a connector (3) at an end of a communication cable (2) or in a communication device (4) to which the connector (3) is connected, the signal detecting device (1) comprising a detection circuit (8) that branches and extracts a portion of a signal transmitted through the communication cable (2) and indicates existence of a data communication based on the extracted signal, and a self-diagnostic circuit (9) that inputs a diagnostic signal into the detection circuit (8) at the time of diagnosis of the detection circuit (8).

[2] The signal detecting device (1) defined by [1], wherein the self-diagnostic circuit (9) is configured to input the diagnostic signal into the detection circuit (8) for a predetermined period of time from the moment power supply to the detection circuit (8) is started.

[3] The signal detecting device (1) defined by [1] or [2], wherein the self-diagnostic circuit (9) comprises an oscillator circuit (16) for generating the diagnostic signal and a self-diagnostic circuit-side matching circuit (17) arranged between the oscillator circuit (16) and the detection circuit (8) to adjust the signal level of the diagnostic signal input from the oscillator circuit (16) to the detection circuit (8).

[4] The signal detecting device (1) defined by [3], wherein the detection circuit (8) and the self-diagnostic circuit (9) are operated using an external power supply (15), and the self-diagnostic circuit (9) comprises a time-constant circuit (18) that is configured to supply power to the oscillator circuit (16) only for a preset period of time from the moment power supply from the external power supply (15) is started.

[5] The signal detecting device (1) defined by [3] or [4], wherein the detection circuit comprises a plurality of detection circuits (8), and the diagnostic signal generated by the single oscillator circuit (16) is input to each of the plurality of detection circuits (8).

[6] The signal detecting device (1) defined by any one of [1] to [5], wherein the detection circuit (8) comprises a light-emitting circuit (14) that indicates the existence of data communication by emitting different colors.

Although the embodiment of the invention has been described, the invention according to claims is not to be limited to the embodiment. Further, please note that all combinations of the features described in the embodiment are not necessary to solve the problem of the invention.

The invention can be appropriately modified and implemented without departing from the gist thereof.

For example, although the light-emitting circuit 14 in the embodiment is configured to emit blue light when data communication is being performed and to emit red light when data communication is not performed, the colors of light are not limited thereto. In addition, although the data communication status is indicated using different emission colors in the embodiment, it is not limited thereto. The light-emitting circuit 14 may have two light-emitting elements emitting the same color so that one of the light-emitting elements emits light when data communication is being performed, the other emits light when data communication is not performed, and the data communication status is recognized based on which of the two light-emitting elements is emitting light.

In addition, although diagnosis of the detection circuit 8 is performed only at the time of turning on the power in the embodiment, the self-diagnostic circuit 9 may be configured to, e.g., additionally have a switch circuit for directly supplying power to the oscillator circuit 16 so that the diagnosis of the detection circuit 8 is performed at a given timing after tuning on the power.

What is claimed is:

1. A signal detecting device provided in a connector at an end of a communication cable or in a communication device to which the connector is connected, the signal detecting device comprising:
    a detection circuit that branches and extracts a portion of a signal transmitted through the communication cable and indicates existence of a data communication based on the extracted signal; and
    a self-diagnostic circuit that inputs a diagnostic signal into the detection circuit upon diagnosis of the detection circuit,
    wherein the self-diagnostic circuit comprises an oscillator circuit which generates the diagnostic signal simulating the signal transmitted through the communication cable to be output to the detection circuit,
    wherein the self-diagnostic circuit is configured to input the diagnostic signal into the detection circuit for a predetermined period of time from a moment that a power supply to the detection circuit is started,
    wherein, when the predetermined period of time elapses, the oscillator circuit stops outputting the diagnostic signal,
    wherein the self-diagnostic circuit has a self-diagnosis function to diagnose a presence or an absence of a failure in the detection circuit that detects the existence or an absence of the data communication, and
    wherein the detection circuit comprises:
        a comparator circuit connected to a rectifier circuit to output a DC signal with a predetermined voltage when an output voltage of the rectifier circuit is at least at a preset threshold voltage; and
        a light-emitting circuit connected to the comparator circuit to indicate the existence of the data communication by emitting different colors.

2. The signal detecting device according to claim 1, wherein the self-diagnostic circuit further comprises:
    a self-diagnostic circuit-side matching circuit arranged between the oscillator circuit and the detection circuit to adjust a signal level of the diagnostic signal input from the oscillator circuit to the detection circuit.

3. The signal detecting device according to claim 2, wherein the detection circuit and the self-diagnostic circuit are operated using the power supply which includes an external power supply, and
    wherein the self-diagnostic circuit further comprises a time-constant circuit that is configured to supply power to the oscillator circuit only for a preset period of time from the moment power supply from the external power supply is started.

4. The signal detecting device according to claim 2, wherein the detection circuit comprises a plurality of detection circuits, and
    wherein the diagnostic signal generated by the single oscillator circuit is input to each of the plurality of detection circuits.

5. The signal detecting device according to claim 1, wherein the detection circuit comprises a matching circuit connected to the communication cable and providing an impedance matching in a predetermined frequency band.

6. The signal detecting device according to claim 5, wherein the matching circuit comprises a resistive circuit.

7. The signal detecting device according to claim 5, wherein the detection circuit further comprises an amplifier circuit that amplifies the extracted signal outputted from the matching circuit.

8. The signal detecting device according to claim 7, wherein the amplifier circuit comprises a grounded emitter circuit.

9. The signal detecting device according to claim 7, wherein the the rectifier circuit is connected to the amplifier circuit to rectify the extracted signal amplified by the amplifier circuit into the DC signal.

10. The signal detecting device according to claim 9, wherein the amplifier circuit is directly connected to the rectifier circuit and the matching circuit.

11. The signal detecting device according to claim 10, wherein the self-diagnostic circuit inputs the diagnostic signal into a transmission path between the amplifier circuit and the matching circuit.

12. The signal detecting device according to claim 9, wherein the self-diagnostic circuit inputs the diagnostic signal into a transmission path between the amplifier circuit and the matching circuit.

13. The signal detecting device according to claim 9, wherein the self-diagnostic circuit further comprises:
    a self-diagnostic circuit-side matching circuit arranged between the oscillator circuit and the detection circuit to adjust a signal level of the diagnostic signal inputted from the oscillator circuit to the detection circuit.

14. The signal detecting device according to claim 13, wherein the self-diagnostic circuit-side matching circuit prevents the extracted signal from being sent to the oscillator circuit.

15. The signal detecting device according to claim 13, wherein the self-diagnostic circuit-side matching circuit is coupled to a transmission path between the amplifier circuit and the matching circuit.

16. The signal detecting device according to claim 1, wherein the comparator circuit is directly connected to the light-emitting circuit and the rectifier circuit.

* * * * *